United States Patent [19]
Allen et al.

[11] Patent Number: 6,064,553
[45] Date of Patent: May 16, 2000

[54] MULTIPLE VOLUME COMPUTER MEDIA TAPE CARTRIDGE

[75] Inventors: Vincent Kanard Allen; Steven Douglas Johnson, both of Tucson, Ariz.

[73] Assignee: International Business Machines Corporation, Armonk, N.Y.

[21] Appl. No.: 09/356,718

[22] Filed: Jul. 20, 1999

[51] Int. Cl.[7] .................................................... G11B 23/02

[52] U.S. Cl. ........................................... 360/132; 360/131

[58] Field of Search ..................................... 360/131, 132, 360/134, 137; 242/326.2, 341, 344, 347

[56] References Cited

U.S. PATENT DOCUMENTS

| | | | |
|---|---|---|---|
| 4,041,537 | 8/1977 | Kishi | 360/60 |
| 4,167,787 | 9/1979 | Sato et al. | 708/108 |
| 5,081,548 | 1/1992 | Inazawa et al. | 360/48 |
| 5,213,510 | 5/1993 | Freeman | 434/321 |
| 5,243,485 | 9/1993 | Weiley | 360/132 |
| 5,287,459 | 2/1994 | Gniewek | 369/34 |
| 5,355,259 | 10/1994 | Shih | 360/72.2 |
| 5,481,427 | 1/1996 | Ishikawa | 360/137 |

OTHER PUBLICATIONS

A. H. Moris, "A New Radio–Broadcast Cartridge Capable of Professional Open–Reel Performance" Nov. 1983, Journal of the Audio Engineering Society, vol. 31 No. 11, pp. 810–816.

Leonard Coplen and Robert Johns, "The Tape Cardtridge Comes of Age", Electronics World, Nov. 1966, pp. 30–32, 96.

IBM Technical Disclosure Bulletin, "User Controls During Tape End–of–Volume Processing", vol. 26, No. 3A, Aug. 1983.

*Primary Examiner*—David L. Ometz
*Assistant Examiner*—Franklin D. Altman
*Attorney, Agent, or Firm*—Robert B. Martin; Felsman, Bradley, Vaden, Gunter & Dillon, LLP

[57] ABSTRACT

A computer media tape cartridge has a multiple volume selector switch with a plurality of positions which allow a user to physically segment the tape into a corresponding number of sections for more efficient use of the tape. By moving the switch to a desired position, the user may select and use the tracks in one or all of the positions on the tape. These positions include an "all position" wherein the tape is a single volume for reading and writing data, and individual positions wherein only the selected position is available for reading or writing data to the tape. Using the cartridge in the latter manner physically segments tape into four separate volumes. The cartridge is used in a tape drive having a plurality of sensors for detecting the position of the switch.

13 Claims, 2 Drawing Sheets

MULTIPLE VOLUME COMPUTER MEDIA TAPE CARTRIDGE

BACKGROUND OF THE INVENTION

1. Technical Field

This invention relates in general to computer media tape cartridges and in particular to a multiple volume computer media tape cartridge.

2. Background Art

Computer tape media cartridges contain spools of magnetic tape having multiple, parallel tracks for reading data from or writing data to the tape. Data is typically read or recorded by moving from a starting point on the first track of the tape to the end of the first track at the physical end of the tape. The process continues with the second track which starts at the end of the first track and proceeds back to the starting point of the first track, and so on.

The capacity of computer tape media cartridges has risen dramatically in recent years. In many cases, users are not readily able to fully utilize the complete data capacity of the tapes. Consequently, a significant amount of data capacity is being wasted. This problem is true of both linear and helical recording technologies.

A few solutions to this problem have been suggested by the prior art. U.S. Pat. No. 5,355,259 describes a partitioning method that is exclusively controlled by data contained on the tape media. U.S. Pat. No. 5,287,459 describes a method of data redundancy aimed at improving tape access time. A third patent, U.S. Pat. No. 5,081,548, partitions a helical scan tape storage subsystem by means of algorithms built into the tape drive with the resultant data stored in two locations. Each of these patents deals with various methods of tape formatting to achieve a separation or partition of data. Although these designs are workable, an improved apparatus and/or method for utilizing a tape cartridge more efficiently is desirable.

SUMMARY OF THE INVENTION

A computer media tape cartridge has a multiple volume selector switch with a plurality of positions which allow a user to physically segment the tape into a corresponding number of sections for more efficient uses of the tape. By moving the switch to a desired position, the user may select and use the tracks in one or all of the positions on the tape. These positions include an "all position" wherein the tape is a single volume for reading and writing data, and individual positions wherein only the selected position is available for reading or writing data to the tape. Using the cartridge in the latter manner physically segments tape into four separate volumes. The cartridges is used in a tape drive having a plurality of sensors for detecting the position of the switch.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
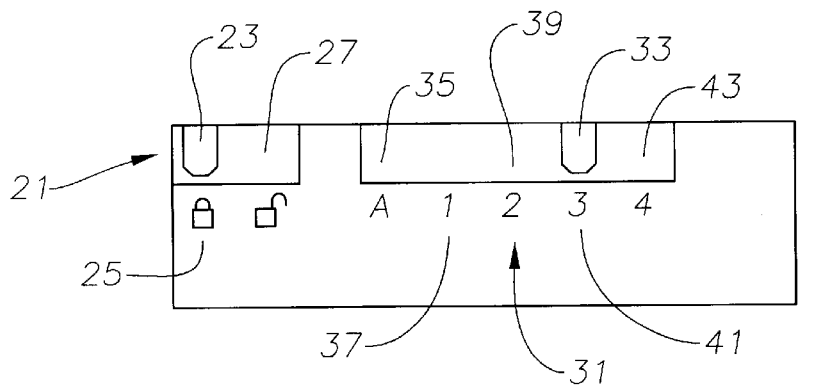
FIG. 1 is an end view of a magnetic computer tape cartridge constructed in accordance with the invention.
Figure 2:
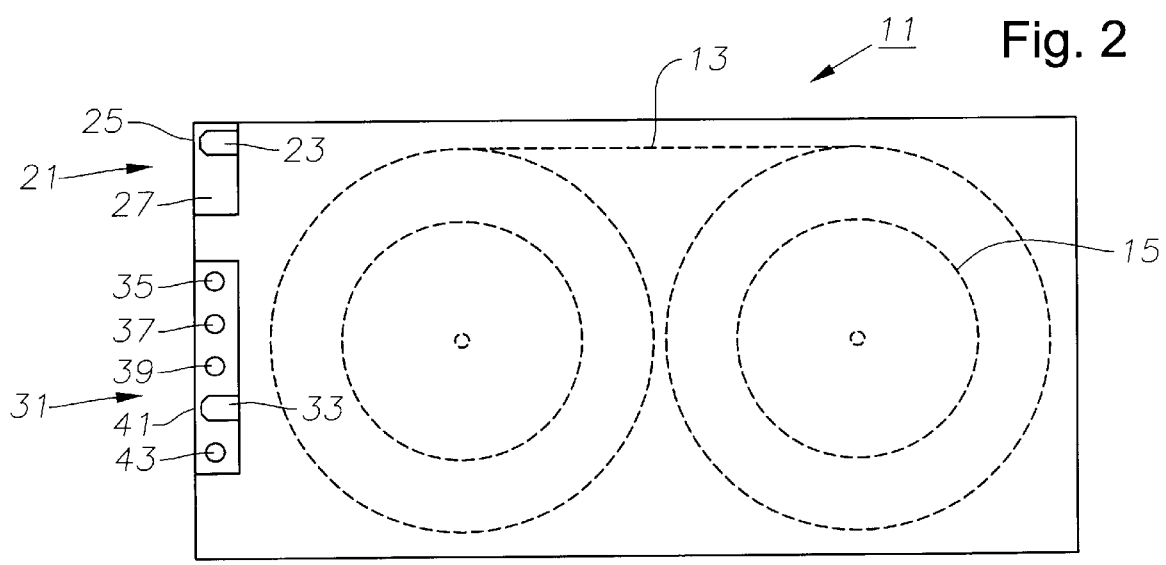
FIG. 2 is a front view of the cartridge of FIG. 1.

Referring to FIGS. 1 and 2, a computer media tape cartridge 11 is shown. Cartridge 11 is a high speed, storage device having an internal cavity with magnetic tape 13 on two tape spools 15. Cartridge 11 has a conventional, external, write-protect switch 21 with a slider 23 that is movable between a locked position 25 and an unlocked position 27. In locked position 25, tape 13 can only be read from and cannot be written to. In unlocked position 27, tape 13 can be read from or written to.

Cartridge 11 also has a multiple volume selector switch 31 that the tape drive 51 (FIG. 3) senses and is controlled by. Switch 31 has a slider 33 with a plurality of positions which allow a user to physically segment tape 13 into a corresponding number of sections for more efficient use of tape 13. By moving slider 33 to a desired position, the user may select and use the tracks in one or all of the positions on tape 13. In the embodiment shown, these positions include an "all position" 35 wherein all of the positions on tape 13 are available to the user as a single volume for reading and writing data, and first, second, third and fourth positions 37, 39, 41, 43, respectively, wherein only the selected position is available for reading or writing data to tape 13. Using cartridge 11 in one of the four independent positions 37, 39, 41, or 43 physically segments tape 13 into four separate volumes.

Figure 3:
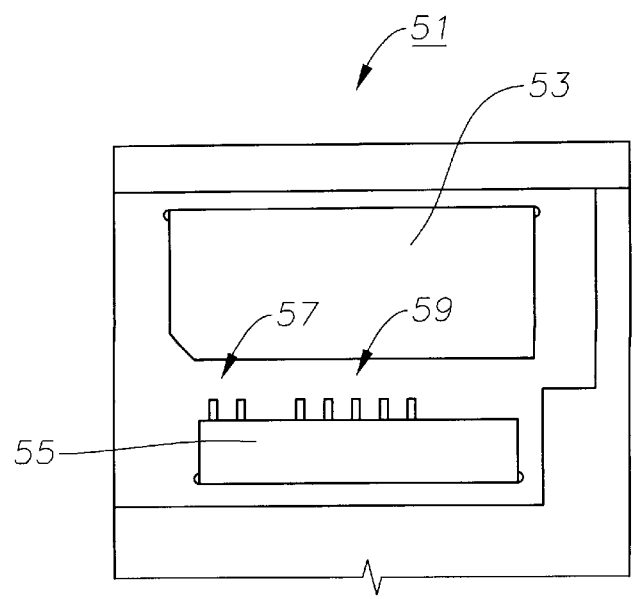
FIG. 3 is an end view of a tape drive for the cartridge of FIG. 1.

As shown in FIG. 3, tape drive 51 having an access door 53 for cartridge 11 is shown. Tape drive 51 contains a pin-sensor monolith 55 having a plurality of sensors 57, 59 for detecting the mode of switches 21 and 31, respectively, and responding in accordance therewith. Sensors 57, 59 detect the positions of sliders 23, 33, respectively, in order to properly handle cartridge 11 with respect to read/write commands and volume usage.

Figure 4:
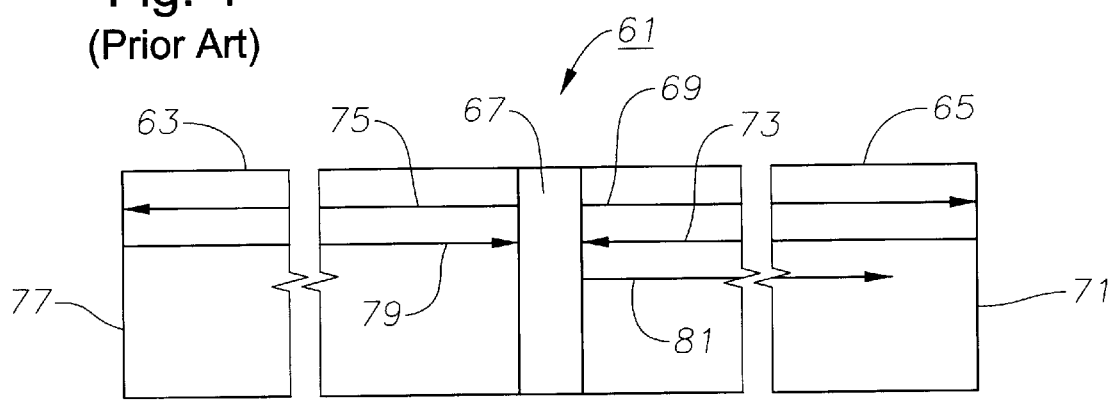
FIG. 4 is a schematic drawing of magnetic tape in a prior art computer cartridge.

In operation (FIG. 4), one type of prior art, single volume media tape 61 has left and right sections 63, 65 that are divided or separated at the midpoint 67 of tape 61. Sections 63, 65 are mirror images of one another. Each section 63, 65 has a plurality of parallel read/write tracks. The beginning of the volume or tape 61 starts at midpoint 67 with the first track 69. Data writing proceeds to the physical end 71 of section 65. At end 71, the second track 73 begins and continues back to midpoint 67. The third track 75 starts at midpoint 67 and continues to the physical end 77 of section 63. At end 77, the fourth track 79 begins and continues back to midpoint 67. The fifth track 81 once again starts at midpoint 67 and continues to end 71 of section 65 just like the first track 69. This process continues for the remainder of the tracks on tape 61. With this conventional cartridge tape 61, the user is unable to select a specific section 63, 65 for more efficient usage of tape 61.

Figure 5:
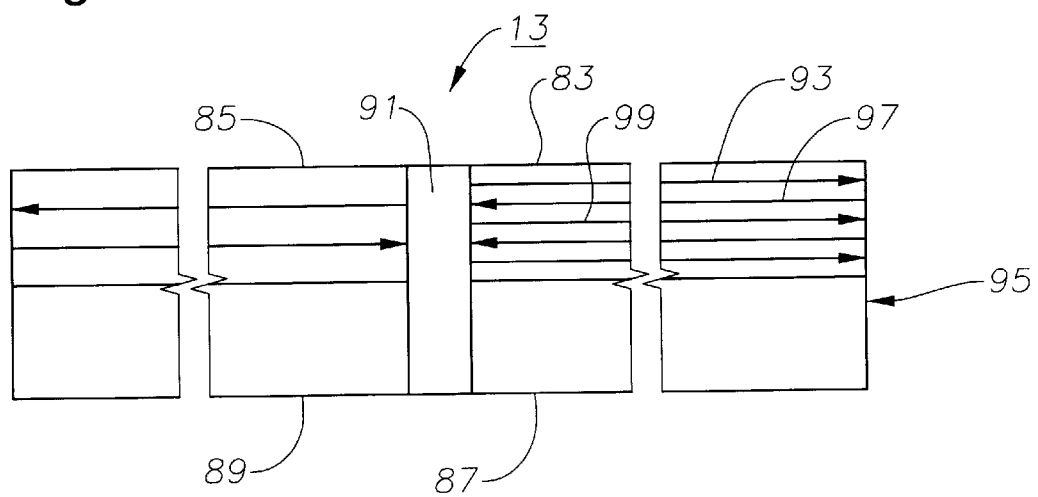
FIG. 5 is a schematic drawing of magnetic tape in the cartridge of FIG. 1.

In contrast, tape 13 of cartridge 11 has a plurality of sections (FIG. 5) that may be combined as a single volume as with prior art tape 61, or selected individually as multiple volumes for smaller quantities of data. In the embodiment shown, tape 13 has four sections 83, 85, 87, 89, which directly correspond to positions 37, 39, 41, and 43, respectively. Sections 83, 87 are physically separated from sections 85, 89 by a midpoint 91 in tape 13, which is the beginning of each section. Sections 83, 87 are mirror images of sections 85, 89.

As an example, if the user puts slider 33 on switch 31 in the "all" position 35 or in the first position 37, the first volume or section 83 will be selected by the logic/control mechanisms of drive 51. Section 83 begins at midpoint 91 with the first track 93. Data writing proceeds to the physical end 95 of section 83. At end 95, the second track 97 begins and continues back to midpoint 91. The third track 99 starts at midpoint 91 and returns to end 95 of section 83 just like the first track 93. This process continues for the remainder of the tracks in section 83.

If slider 33 is in the all position 35, tape drive 51 will proceed to the remaining sections 85, 87, 89 in order after section 83 is filled. Sections 85, 87, 89 will be used in the same manner as section 83, thereby using tape 13 as a single volume. If slider 33 is in the first position 37, tape drive 51 will only read/write to section 83. Once section 83 is full, the logic/control mechanisms of tape drive 51 will prevent it from accessing the other sections 85, 87, 89 unless the user moves slider 33 to one of the other positions 35, 39, 41, or 43. Consequently, the tape drive 51 will operate in only one of sections 85, 87, 89 if one of positions 39, 41, 43, respectively, is selected.

The invention has several advantages. The media tape cartridge allows users to essentially segment a single cartridge into multiple cartridges. This is achieved using a simple, physical switch on the exterior of the cartridge. The information used to segment the tape is not encoded on the tape itself. The user's selection (either a single volume or a particular volume of the multiple volume set) is communicated directly to the tape drive at loading or initialization time without any new or additional requirements on the host operating system or application software.

While the invention has been shown or described in only some of its forms, it should be apparent to those skilled in the art that it is not so limited, but is susceptible to various changes without departing from the scope of the invention.

We claim:

1. A media tape cartridge, comprising:

a housing;

a media tape mounted within the housing, the media tape having a plurality of sections, each of which has a plurality of read/write tracks;

a multiple volume selector switch located on the housing and having a plurality of switch positions, each switch position corresponding to one of the sections of the media tape; and wherein when one of the switch positions is selected, only the corresponding one of the sections of the media tape is accessible by a tape drive.

2. The cartridge of claim 1 wherein the media tape has a central midpoint break between some of the sections.

3. The cartridge of claim 1, further comprising a single volume switch position wherein all of the sections are selected to function as a single volume.

4. The cartridge of claim 1 wherein the media tape has four sections and the multiple volume selector switch has five switch positions, including one switch position for each of the four sections and a fifth switch position for selecting all of the sections to function as a single volume.

5. The cartridge of claim 1 wherein the multiple volume selector switch has a slider that is movable to each of the switch positions.

6. The cartridge of claim 1, further comprising an external, write-protect switch on the housing having a slider that is movable between a locked position wherein the media tape can only be read and cannot be written to, and an unlocked position wherein the media tape can be read or written to.

7. A media tape cartridge, comprising:

a tape spool holder;

a spool of media tape mounted to the tape spool holder and having a plurality of sections with a central, midpoint break between some of the sections, each of the sections having a plurality of read/write tracks;

a multiple volume selector switch located on the tape spool holder and having a single volume switch position that corresponds to all of the sections of the media tape, and a plurality of switch positions that individually correspond to one of the sections of the media tape, respectively; and wherein when the single volume switch position is selected, all of the sections of the media tape are selected to function as a single volume for access by a tape drive, and when one of said plurality of switch positions is selected, only the corresponding one of the sections of the media tape is accessible by the tape drive.

8. The cartridge of claim 7 wherein the media tape has four sections and the multiple volume selector switch has five switch positions, including one switch position for each of the four sections and a fifth switch position, corresponding to the single volume switch position, for selecting all of the sections to function as the single volume.

9. The cartridge of claim 7 wherein the multiple volume selector switch has a slider that is movable to each of the switch positions.

10. The cartridge of claim 7, further comprising an external, write-protect switch on the tape spool holder having a slider that is movable between a locked position wherein the media tape can only be read and cannot be written to, and an unlocked position wherein the media tape can be read or written to.

11. A method for selectively using a media tape cartridge, comprising:

(a) providing a cartridge having a media tape with a plurality of sections, and a multiple volume selector switch on the cartridge having a plurality of switch positions, each of the switch positions corresponding to one of the sections of the media tape;

(b) moving the multiple volume selector switch to a selected switch position;

(c) placing the cartridge in a tape drive;

(d) determining the location of the switch position with the tape drive; and then (e) accessing said corresponding one of the sections of the media tape with the tape drive.

12. The method of claim 11 wherein step (b) comprises selecting a single volume switch position wherein, in step (e), all of the sections of the media tape are selected and accessed to function as a single volume.

13. The method of claim 11, further comprising the step of moving a write-protect switch on the cartridge between a locked position wherein the media tape can only be read from and cannot be written to, and an unlocked position wherein the media tape can be read from or written to.

* * * * *